United States Patent
Tanguy et al.

(10) Patent No.: US 11,925,976 B2
(45) Date of Patent: Mar. 12, 2024

(54) METHOD FOR MANUFACTURING A MOLD ELEMENT FOR A TIRE MOLD

(71) Applicant: COMPAGNIE GENERALE DES ETABLISSEMENTS MICHELIN, Clermont-Ferrand (FR)

(72) Inventors: Didier Tanguy, Clermont-Ferrand (FR); Jerome Lepretre, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 212 days.

(21) Appl. No.: 17/418,172

(22) PCT Filed: Dec. 12, 2019

(86) PCT No.: PCT/EP2019/084844
§ 371 (c)(1),
(2) Date: Jun. 24, 2021

(87) PCT Pub. No.: WO2020/136015
PCT Pub. Date: Jul. 2, 2020

(65) Prior Publication Data
US 2022/0105560 A1     Apr. 7, 2022

(30) Foreign Application Priority Data
Dec. 26, 2018  (FR) ........................ 1874148

(51) Int. Cl.
*B22D 17/24*     (2006.01)
*B22D 19/00*     (2006.01)
(Continued)

(52) U.S. Cl.
CPC ............. *B22D 17/24* (2013.01); *B22D 19/00* (2013.01); *B29C 33/3842* (2013.01);
(Continued)

(58) Field of Classification Search
CPC ..... B22D 17/24; B22D 19/00; B29D 30/0606
See application file for complete search history.

(56) References Cited

FOREIGN PATENT DOCUMENTS

| CN | 101376168 A | * | 3/2009 |
| JP | 2000-102925 A | | 4/2000 |
| JP | 2000-102926 A | | 4/2000 |

OTHER PUBLICATIONS

English machinet translation of CN 101376168 A (Year: 2009).*
International Search Report dated Mar. 30, 2020, in corresponding PCT/EP2019/084844 (4 pages).

* cited by examiner

*Primary Examiner* — Kevin P Kerns
*Assistant Examiner* — Steven S Ha
(74) *Attorney, Agent, or Firm* — VENABLE LLP (57) ABSTRACT

A method for manufacturing a mold element using a manufacturing device comprising a die and a counter-mold defining a molding cavity in the closed position, comprises: opening the manufacturing device; placing at least one insert 22, produced by laser sintering, against a molding surface of the die; mounting at least one wedge 28 on the die so as to bear against said insert in order to immobilize it relative to said molding surface; closing the manufacturing device, the counter-mold pressing onto said wedge in order to keep said insert pressed against said molding surface; injecting aluminium into the molding cavity of the manufacturing device; opening the manufacturing device; and extracting from the manufacturing device the mold element provided with a molding face formed by at least part of said insert and by the aluminum.

15 Claims, 4 Drawing Sheets

(51) Int. Cl.
*B29C 33/38* (2006.01)
*B29D 30/06* (2006.01)
*B33Y 80/00* (2015.01)

(52) U.S. Cl.
CPC .......... *B29D 30/0606* (2013.01); *B33Y 80/00* (2014.12); *B29D 2030/0612* (2013.01)

METHOD FOR MANUFACTURING A MOLD ELEMENT FOR A TIRE MOLD

BACKGROUND

The present invention concerns the general field of curing or vulcanisation moulds for vehicle tyres.

More particularly, the present invention concerns a mould element intended to be used in this type of mould.

Conventionally, a curing mould comprises two lateral shells, each moulding one of the side walls of the tyre, and a plurality of sectors for moulding the tread of said tyre. The shells and the sectors define an internal space intended to be brought into contact with the unvulcanised tyre blank.

To mould the tread of the tyre, the mould sectors comprise insert elements generally made of aluminium. An "insert element" is a part of the mould which comprises a moulding surface for moulding at least part of the rolling surface of the tread and the profiles of said tread.

To produce these insert elements, one solution is to use a die of friable material, for example plaster, which integrates aluminium fins intended to form the profiles of the tyre tread. The fins are immersed in the die with the exception of the external parts or feet which remain protruding. Aluminium is cast onto the die in order to form the insert element. The fins of the die are then anchored in the insert element during its moulding. It is then necessary to destroy the die in order to release the fins and the insert element.

This type of die has the major drawback of allowing only single use, which is not ecologically favourable. Also, around twelve (for example between eight and twenty-four) are required to manufacture the whole of a tyre mould, and sometimes, when several identical moulds must be manufactured, it is necessary to produce several examples of identical dies which are then destroyed.

In order to produce insert elements by aluminium moulding, another solution is to use a steel die which is first machined by cavity sinking using EDM, or by milling, or by a process combining these two technologies. However, the conventionally used electrodes for cavity sinking using EDM limit the complexity of the shapes which can be machined, and hence the complexity of the tyre profiles which can then be manufactured. In addition, relatively simple shapes must be provided on the steel die so that it is then possible to remove the injected aluminium from the mould.

Also, irrespective of the type of die used for manufacture, it is not possible to produce small-dimensioned textures—which are designed for example to obtain specific marking on the moulded tyres—on aluminium insert elements insofar as such aluminium textures are not resistant to the curing environments of the tyres or to mould cleaning operations.

The present invention aims to remedy these drawbacks.

SUMMARY

The present invention concerns a method for manufacturing a mould element for a tyre mould using a manufacturing device of the type comprising a die and a counter-mould defining a moulding cavity in the closed position.

The manufacturing method comprises the following steps:
opening the manufacturing device;
placing at least one insert, produced by laser sintering, against a moulding surface of the die;
mounting at least one wedge on the die so as to bear against said insert in order to immobilise it relative to the moulding surface of the die;
closing the manufacturing device, the counter-mould pressing onto said wedge in the closed position of said device in order to keep said insert pressed against the moulding surface of the die;
injecting aluminium into the moulding cavity of the manufacturing device;
opening the manufacturing device;
extracting from the manufacturing device the mould element provided with a moulding face formed by at least part of said insert and by the aluminium.

The "moulding surface of the die" means the surface of the die which partially delimits the moulding cavity of the manufacturing device.

The "moulding face of the mould element" means the face against which the tyre will come into contact during moulding in the associated mould, and which is intended to mould all or part of the tread and/or of one of the side walls of said tyre.

A "tyre" means all types of elastic tyres, whether or not subjected to internal pressure.

A "tread" of a tyre means a quantity of rubbery material delimited by two lateral surfaces and by two main surfaces, one of which (called the rolling surface) is intended to come into contact with the road surface when the tyre is running. The tread comprises a plurality of cutouts which extend onto at least one of the side faces.

A "side wall" of a tyre means part of the side face of the tyre arranged between the tread and a bead of this tyre, starting from the ends of the cutouts of the tread and extending up to the bead.

An "insert produced by laser sintering" means an insert manufactured by selective laser melting of powder, in particular metallic powder, constructed by superposition of melted layers one upon the other. This manufacturing technique is generally called selective laser melting (SLM). The insert may be made of a material such as steel, or a stronger material than aluminium.

With the manufacturing process as defined above, the mould element produced comprises at least one insert defining part of the sculpture and/or profile of the part of the tyre to be moulded, which is a continuity of the part of the sculpture and/or profile formed by the aluminium body.

This insert is anchored in the aluminium body during casting of the aluminium. This allows the insert to be securely held in the injected aluminium.

Also, immobilisation of said insert inside the manufacturing device by the wedge, and by the force exerted by the counter-mould on this insert via said wedge, ensures good positioning of the insert after moulding. During injection, the passage of aluminium between the insert and the moulding surface of the die is thus avoided, even on pressurised injection of aluminium.

An "injection of aluminium" means an injection of pure aluminium or an injection of aluminium alloy.

The insert or inserts stiffen the mould element in comparison with conventional mould elements produced solely from aluminium, which improves the resistance to curing and cleaning. Apart from stiffening, the mould element thus produced has a surface of a greater hardness than conventional moulds.

In addition, since the insert or inserts is/are produced by laser sintering, it is possible to produce patterns or textures with very small dimension on these inserts, for example forming a contrast with respect to the rest of the moulding face of the mould element. Production of the insert or inserts by laser sintering thus has the advantage of allowing the provision of complex shapes.

A "texture" on an insert means part of the insert which has surface state characteristics different from the rest of the insert and from the aluminium body. Such a texture is produced from the same material as the insert on which it is formed, i.e. made of the same material. The texture may be obtained during additive manufacture of the insert, or be obtained later by an operation such as laser engraving, as stated above.

Advantageously, said insert may be made of a material with a greater hardness than the injected aluminium. In a particular embodiment, the texture or textures are obtained during a step of laser engraving of said insert. Alternatively, the texture or textures may be produced by other methods.

In a particular embodiment, the step of laser engraving is performed after a step of surface treatment of the moulding face, in particular by sanding or polishing. More generally, the step of laser engraving is preferably performed after all operations of machining the moulding face of the mould element.

Thus the machining operations carried out after moulding do not reduce the quality of the contrast effect of the texture or textures formed on the insert or inserts of the mould element by laser engraving or by other methods, nor the quality of the geometry of the desired texture.

In another embodiment, the insert or inserts mounted against the die may already be provided with textures forming a contrast. In this case, the texture or textures of each insert may be produced directly during the additive manufacturing of said insert or by a preceding operation of laser engraving for example.

The powder-based additive manufacturing of said insert by laser sintering is performed using an additive manufacturing machine.

The manufacturing method as defined above may also comprise the step of manufacture of said insert, the additive manufacturing machine and the manufacturing device being arranged successively on a same production line.

Alternatively, the mould element may be manufactured using one or more inserts prefabricated on a specifically dedicated line, which may for example be situated at a separate production site.

Also, since the insert or inserts are produced by laser sintering, they may be provided with specific shapes in order to form means promoting their anchoring in the injected aluminium.

The manufacturing method may also comprise, after said step of surface treatment, a step of cutting for finally establishing the dimensions of the mould element and for obtaining a moulding face formed exclusively by said insert or by the injected aluminium.

During this step, cutting takes place of the parts of the mould element which comprise one or more portions of the wedge present at the moulding face of the unfinished mould element leaving the manufacturing device.

In a particular embodiment, said wedge, which is mounted so as to bear against said insert, is made of aluminium. Because this wedge is made from a material of the same family as the injected material, during moulding of the tyres in the mould equipped with the mould element, it is possible to avoid significant differential thermal expansion rates between the body and the wedge immersed in said body. Also, when a step of cutting the mould element is provided as specified above, this facilitates the operation insofar as the body and the wedge substantially have the same characteristics of mechanical strength.

In an optional embodiment, in the closed position of the manufacturing device, axial passages are arranged between said wedge and a moulding surface of the counter-mould. This promotes the flow of the injected aluminium inside the moulding cavity of the manufacturing device.

In a particular embodiment, said wedge is inserted in slots of the moulding surface of the die.

In a particular embodiment, said insert may be arranged inside a housing which is recessed from the moulding surface of the die. Alternatively, said insert may not be arranged inside such a recessed housing.

The invention furthermore concerns a method for manufacturing a mould for a tyre of the type comprising a tread and two side walls, the mould comprising first and second shells for moulding the side walls of the tyre, and a plurality of sectors distributed in the circumferential direction for moulding the tread of said tyre.

The method comprises the following steps: manufacturing at least one mould element using the manufacturing method as defined above, and fixing said manufactured mould element on a support block of the associated sector or the associated shell.

BRIEF DESCRIPTION OF THE FIGURES

The present invention will be better understood from reading the detailed description of exemplary embodiments, which are in no way limitative and are illustrated by the attached drawings, in which.

DETAILED DESCRIPTION

Figure 1:
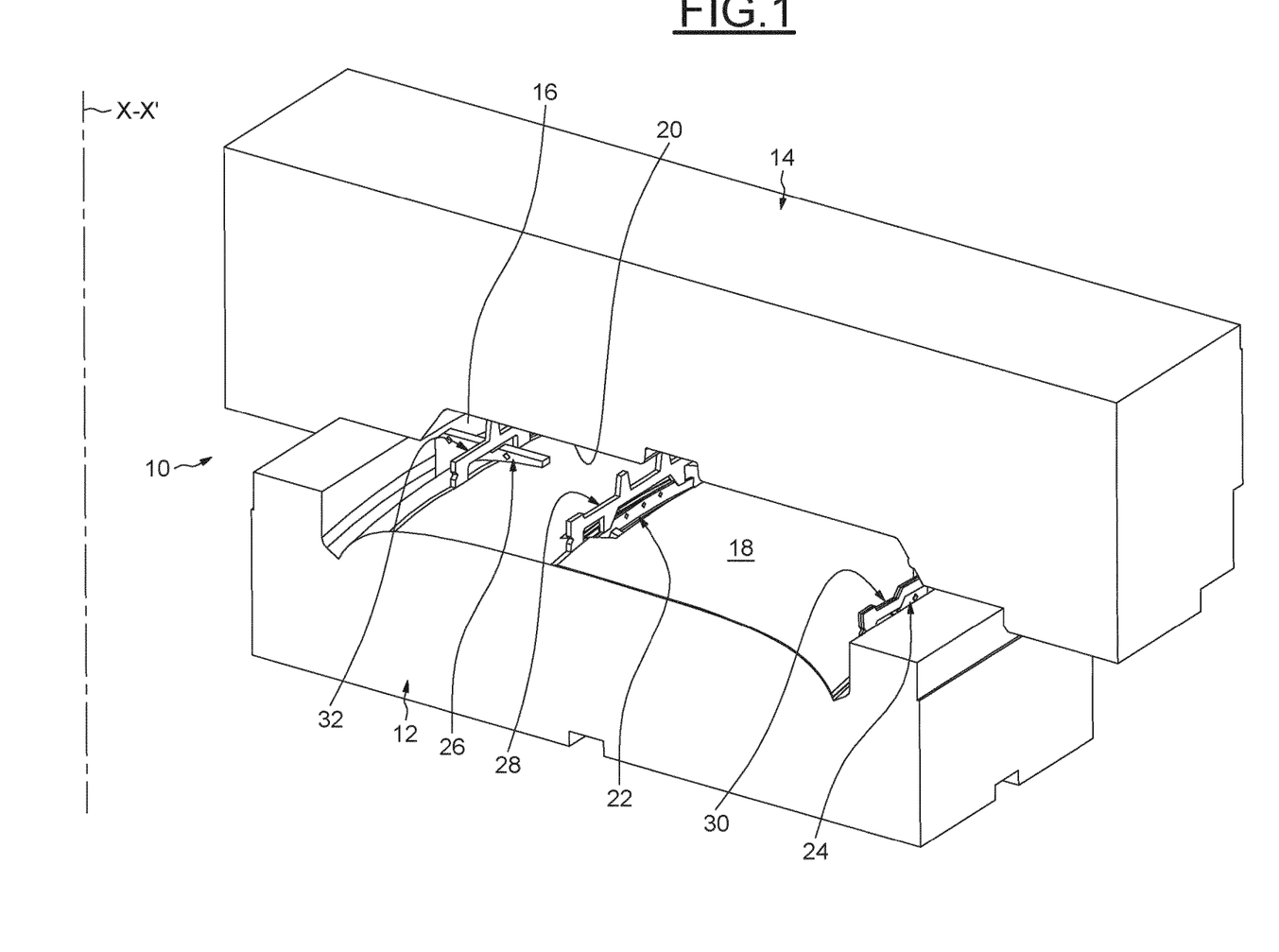
FIG. 1 is a partial, perspective view of a manufacturing device for a mould element according to an exemplary embodiment of the invention.

FIG. 1 shows partially an exemplary embodiment of the manufacturing device, designated 10 as a whole, provided for moulding a mould element intended to be used in a tyre curing mould.

In the exemplary embodiment illustrated, the device 10 is designed so as to be able to obtain by moulding a mould element, which then, once mounted in the associated curing mould, allows profiles to be formed in the tread of the tyres. This is known as an insert element.

The device 10 comprises a die 12 and a counter-mould 14, each of which are fixed to two parts (not shown) of a tooling, and are movable relative to one another along a displacement axis X-X' between an open, distanced position and a closed moulding position. In the closed position of the device 10, the die 12 and the counter-mould 14 bear against one another and between them define a moulding cavity 16 of the mould element.

The moulding cavity 16 defines in recess the general shape of the mould element to be obtained. The die 12 comprises a moulding surface 18 which partially delimits the moulding cavity 16. The moulding surface 18 corresponds in shape to the curvature of the part of the tyre tread which will later be produced by moulding by the mould element. The die 12 is made of steel.

The counter-mould 14 is made of two integral parts, only one of which is shown on FIG. 1 for reasons of clarity. The counter-mould 14 comprises a moulding surface 20 oriented towards the moulding surface 18 of the die, which also delimits the moulding cavity 16. The counter-mould 14 comprises a casting channel (not shown) which opens into the moulding cavity 16 to allow its filling. The casting channel is arranged between the two parts of the counter-mould 14. The counter-mould 14 is also made of steel.

Figure 2:
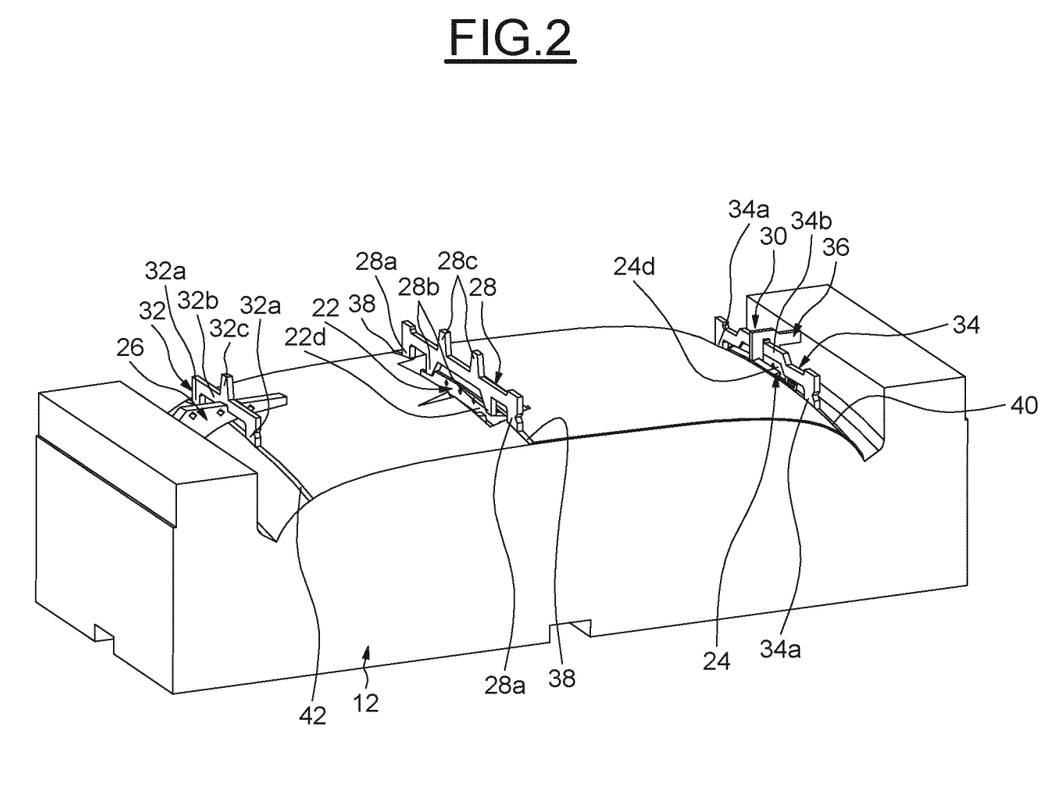
FIG. 2 is a perspective view of a die of the manufacturing device in FIG. 1, FIG. 3 and FIG. 4 are perspective views of an insert mounted against the die of FIG. 2, FIG. 5 and FIG. 6 are perspective views of another insert mounted against the die of FIG. 2.

With reference to FIGS. 1 and 2 together, it is clear that the inserts 22, 24, 26 are mounted so as to bear against the moulding surface 18 of the die. Each insert 22 to 26 is made in a single part by laser sintering. On these figures, only three inserts have been shown for reasons of simplicity. A greater number of inserts may naturally be provided.

As will be described in more detail below, after moulding of the mould element, the inserts 22 to 26 partially form the moulding face of said mould element.

In the exemplary embodiment illustrated, the insert 26 is oriented transversely to the inserts 22, 24. The insert 22 is arranged in a central part of the moulding surface 18 of the die, while the inserts 24 and 26 are arranged in a shoulder part of said moulding surface 18. It will be understood that the number of inserts mounted against the die 12 and their orientation, arrangement and design depend on the mould element to be obtained.

Figure 3:
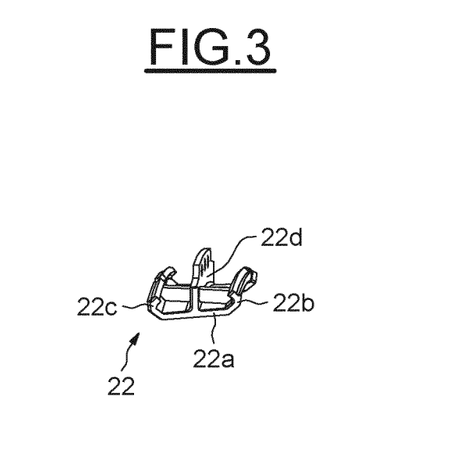
Figure 4:
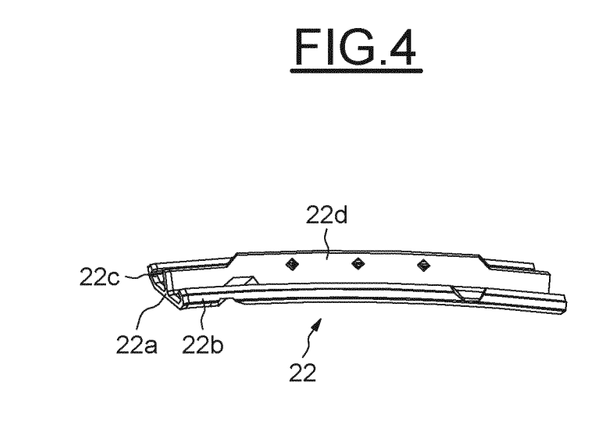

As evident on FIGS. 3 and 4, in the exemplary embodiment illustrated, the insert 22 comprises a longitudinal base part 22a and two curved side branches 22b, 22c which each extend a lateral end of the base part 22a. In the mounted position of the insert 22 against the die 12, as illustrated on FIGS. 1 and 2, the base part 22a comes to bear against the moulding surface 18 thereof. The insert 22 also comprises a central branch 22d extending from the base part 22a and arranged between the side branches 22b, 22c.

As will be described in more detail below, the branches 22b to 22d promote the anchoring of the insert 22 during injection of aluminium into the moulding cavity, and the branch 22d also allows said insert to be held in position during this injection. In the exemplary embodiment illustrated, the branch 22d of the insert is equipped with through holes for further promoting this anchoring. As a variant, it is possible not to provide such holes.

Figure 5:
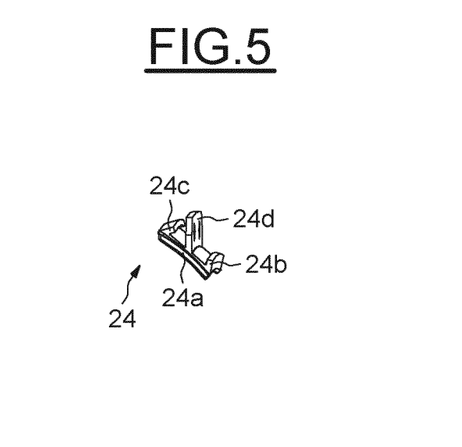
Figure 6:
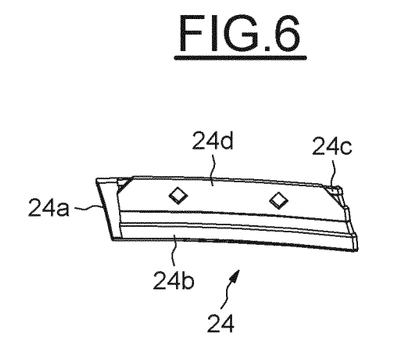

In a similar fashion to the insert 22, and as illustrated on FIGS. 5 and 6, the insert 24 comprises a longitudinal base part 24a, two curved side branches 24b, 24c each extending a lateral end of the base part, and a central branch 24d extending from said base part and arranged between the side branches 24b, 24c. In the exemplary embodiment illustrated, the branch 24d of the insert is also equipped with through holes. Here again, it is possible not to provide such holes as a variant. The insert 26 itself has the form of a fin of substantially constant thickness and generally triangular form.

With reference again to FIGS. 1 and 2, each insert 22 to 26 is mounted inside a recessed housing (not referenced) formed on the moulding surface 18 of the die. The inserts 22, 24 are fully mounted inside the associated housings. The recessed housings for the inserts 22, 24 are designed to form protuberances on the mould element, which will later each allow moulding of part of a circumferential groove on the tyre with respect to its axis of rotation. The insert 26 is mounted partially inside the associated recessed housing. The housing for the insert 26 is intended to form a protuberance on the mould element which will later allow moulding of part of a radial cut-out on the tyre.

Also, FIGS. 1 and 2 show that wedges 28, 30, 32 are mounted on the die 12, each of these wedges coming to bear against one of the inserts 22, 24, 26 in order to hold said insert pressed against the base of the associated housing. The wedges 28, 30, 32 are made of aluminium, in particular pure aluminium, and may for example be obtained by moulding or from plates via a laser cutting process or by wire erosion. In the exemplary embodiment illustrated, the wedges 28 and 32 are made of one piece while the wedge 30 is made of two separate parts 34, 36.

In the closed position of the device 10, the counter-mould 14 rests on each of the wedges 28 to 32 so as to axially press the inserts 22 to 26 against the moulding surface 18 of the die, in this case the base of the housings provided on this moulding surface.

Slots 38, 40 and 42 are formed on the moulding surface 18 of the die for mounting of the wedges 28 to 32. The slots are blind. The slots 38 to 42 are sufficiently wide for the wedges 28, 30, 32 to be inserted inside these, and sufficiently narrow for said wedges to remain in place after mounting and during injection of the aluminium. For information, the gap between the slots and each associated wedge may lie for example between 0.01 mm and 0.05 mm.

For mounting inside the associated slots 38 to 42 of the die, each wedge 28, 30, 32 is provided with two mounting lugs 28a, 34a, 32a which come to be inserted axially inside said slots on either side of the associated insert 22, 24, 26. The wedge 28 is also provided with two blocking lugs 28b which are in axial contact against the branch 22d of the insert 22. The gap between these blocking lugs 28b is designed such that said lugs transversely grip between them a tapered portion of the branch 22d of the insert 22. The wedge 28 is also provided with two support lugs 28c which extend towards the counter-mould 14 on the side opposite the locking lugs 28b and the insert 22. The support lugs 28c are spaced apart in the transverse direction. In the closed position of the device 10, the counter-mould 14 bears axially on the support lugs 28c of the wedge.

The part 34 of the wedge 30 comprises the two mounting lugs 34a and a central blocking part 34b in axial contact against the branch 24d of the insert 24. The central blocking part 34b is configured so as to transversely block the branch 24d of the insert 22. The part 36 of the wedge 30 extends transversely relative to the part 34. The part 36 bears axially against the part 34 on the opposite side of the insert 24, and laterally on either side of this part 34. The part 36 also bears axially on the insert 24. The part 36 comes to stop laterally against a shoulder of the die 12. In the closed position of the device 10, the counter-mould 14 bears axially on the part 36 of the wedge 30.

The wedge 32 is provided with a central support part 32b in contact against the base of a slot of the insert 26. The wedge 32 is also provided with a support lug 32c extending towards the counter-mould 14 on the side opposite the insert 26. In the closed position of the device 10, the counter-mould 14 bears axially on the support lug 32c of the wedge. In the closed position of the device 10, taking into account the specific shape of the wedges 28 to 32, passages are provided axially between each of these wedges and the moulding surface 20 of the counter-mould.

Figure 7:
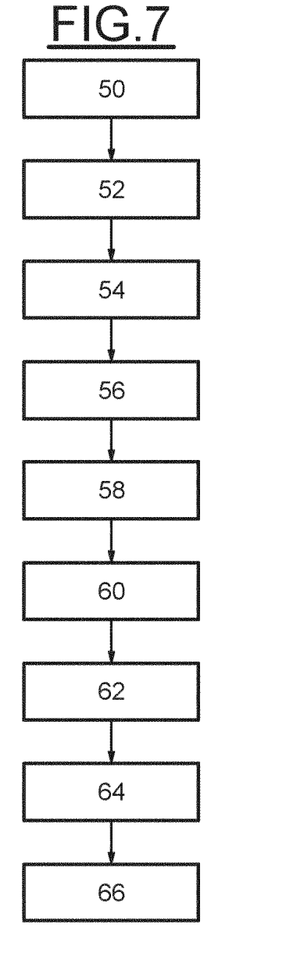
FIG. 7 is a flow diagram of a manufacturing method for a mould element according to an exemplary embodiment of the invention.

With reference to FIG. 7 and to FIGS. 1 and 2, we will now describe the steps of the manufacturing method for obtaining the mould element using the manufacturing device 10.

In a first step designated 50, the manufacturing device 10 is opened for separating the die 12 and counter-mould 14 from one another.

Then during a second step 52, the inserts 22 to 26 are arranged resting against the moulding surface 18 of the die, in this case against the base of the housings of this moulding surface. Then in a third step 54, wedges 28 to 32 are inserted inside the slots 38, 40, 42 of the die until they come to bear against the inserts 22 to 26 so as to immobilise the latter.

Then during a fourth step 56, the manufacturing device 10 is closed so as to bring the die 12 and counter-mould 14 to bear one against the other. As indicated above, in the closed position of the device 10, the counter-mould 14 bears on the wedges 28 to 32, which has the effect of holding the inserts 22 to 26 pressed against the moulding surface 18 of the die.

Then during a fifth step 58, aluminium—for example, an aluminium alloy—is injected under pressure into the moulding cavity 16. For information, the aluminium injection pressure is between 100 bar and 175 bar.

During this fifth step 58, once the moulding cavity 16 has been filled, the aluminium is held under pressure in the moulding cavity 16. This pressure-holding is achieved using a piston (not shown) which also serves for filling. The holding pressure in the moulding cavity may for example be equal to the filling pressure.

During the injection step, inserts 22 to 26 and wedges 28 to 32 are partially immersed in the aluminium which fills the moulding cavity 16. In this way, the inserts 22 to 26 and wedges 28 to 32 are fixed to the aluminium. The branches of inserts 22 and 24 further promote the anchoring in the aluminium.

Then after cooling, the crude mould element which has just been moulded is extracted from the device 10 during a sixth step 60. The crude mould element integrates the inserts 22 to 26 and the wedges 28 to 32. The face of the mould element, which was in contact with the moulding surface 18 of the die inside the manufacturing device 10, is the moulding face of said element against which the tyre will come into contact when said mould element is fixed to the associated mould. At this stage, this moulding face is formed by the aluminium body, the inserts 22 to 26 and the wedges 28 to 32.

Then during a seventh step 62, the side faces of the crude mould element are cut out such that the face of the mould element is formed exclusively by the aluminium body and the inserts 22 to 26, so as to obtain the final dimensions of the mould element. This cutting step may be carried out for example using wire electro-erosion or by milling, which represents a faster and cheaper alternative. The mould element obtained after cutting is partially illustrated in FIG. 8. The moulding face of the mould element is marked 44 on FIG. 8.

Figure 8:
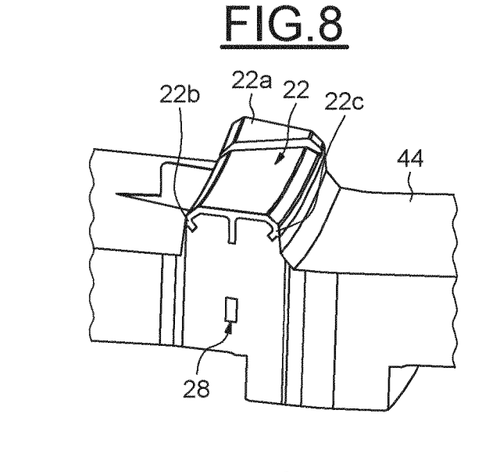
FIG. 8 is a partial, perspective view of a mould element according to another exemplary embodiment of the invention.

In a variant embodiment of the method, this step of cutting out the crude mould element taken from the device 10 may not be provided. This may be the case for example when the dimensions of the moulding cavity of the device correspond to the final dimensions of the mould element, and when the wedges 28 to 32 do not come to rest against the base of the slots of the moulding surface 18 of the die, so as to obtain, for the mould element extracted from the device, a moulding face 44 formed solely by the aluminium body and the inserts 22 to 26.

In an eighth step 64 of the method, a step of surface treatment of the moulding face 44 of the mould element is performed, for example by sanding, polishing, shot blasting etc. This step of surface treatment is not obligatory in all embodiments of the method.

Finally, in a ninth and final step 66 of the method, it is possible to provide a step of machining or laser engraving of the part of the or each insert 22 to 26 which partially forms the moulding face 44 of the mould element. This step is performed using a laser engraving machine.

Figure 9:
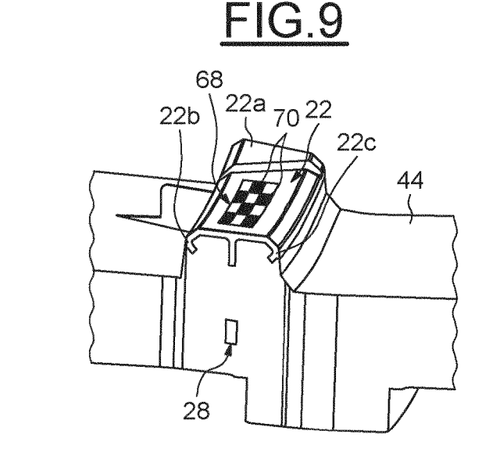
FIG. 9 is a partial, perspective view of a mould element according to another exemplary embodiment of the invention.

For example, as illustrated in FIG. 9, it is possible to engrave onto the part of the base 22a of the insert 22, a texture 68 which contrasts with the rest of the moulding face 44 of the mould element.

In the exemplary embodiment illustrated, the texture 68 is composed of a plurality of motifs 70 which have an identical external form, here rectangular, and are arranged on the insert 22 so as to form a grid pattern with the untextured parts of the insert. A "motif" here means a zone of the texture comprising an arrangement of protuberances and/or recesses formed on the insert 22. This gives a "velvet" type of texture.

As a variant, it is possible to provide other arrangements for the texture. The texture may for example comprise letters and/or symbols and/or figures, in particular for indicating technical data of the tyre. The texture may also comprise legal information, or data distinctive of the make of tyre etc. It is also possible to provide that the texture surrounds a recessed zone of the insert, so as to obtain a wear indicator during moulding of the tyre.

As indicated above, the texture may comprise raised protuberances and/or recesses formed on the insert 22. The protuberances may for example take the form of strands, fins, parallelepipeds etc. The recessed elements may for example take the form of cavities of tapered or circular form, for example polygonal, star-shaped or irregular forms etc. The recessed elements may also take the form of stripes. The protruding and/or recessed elements of the texture may be distributed therein in an ordered or disordered fashion, and/or have constant or variable forms, and/or constant or variable depths.

As indicated above, the step of laser engraving of the inserts 22 to 26 in the moulding face 44 is not obligatory. Alternatively, it is possible during step 52 to mount inserts already provided with textures on the face coming to rest against the moulding face 18 of the die. However in this case, if a surface treatment step is provided on the moulding face 44 of the mould element leaving the manufacturing device 10, the contrast effect of the texture or textures may be affected. In another embodiment, it is also possible to produce a mould element comprising inserts without texture (s) on the moulding face 44.

In the manufacturing method just described, this begins by opening the manufacturing device and installing the inserts. In another embodiment, the manufacturing method may begin with the step of manufacture of the insert(s) by laser sintering.

The invention has been described on the basis of a mould element provided for moulding the tread of the tyre. As indicated above, it is also possible to provide this type of mould element for moulding part of one of the side walls or both side walls of the tyre, without leaving the scope of the invention.

The invention claimed is:

1. A method for manufacturing a mold element for a tire mold using a manufacturing device comprising a die and a counter-mold defining a molding cavity in a closed position, the method comprising the following steps:
- opening the manufacturing device;
- placing at least one insert, produced by laser sintering, against a molding surface of the die;
- mounting at least one wedge on the die so as to bear against the at least one insert in order to immobilize it relative to the molding surface of the die;
- closing the manufacturing device, the counter-mold pressing onto the at least one wedge in the closed position in order to keep the at least one insert pressed against the molding surface of the die;
- injecting aluminum into the molding cavity of the manufacturing device;
- opening the manufacturing device; and
- extracting from the manufacturing device the mold element provided with a molding face formed by at least part of the at least one insert and by the aluminum.

2. The method according to claim 1, wherein the at least one wedge mounted so as to bear against the at least one insert is made of aluminum.

3. The method according to claim 1, wherein, in the closed position of the manufacturing device, axial passages are arranged between the at least one wedge and a molding surface of the counter-mold.

4. The method according to claim 1, wherein the at least one wedge is inserted in slots in the molding surface of the die.

5. The method according to claim 1, wherein the at least one insert is made of a material with a greater hardness than the injected aluminum.

6. The method according to claim 1, further comprising, after the step of extraction from the manufacturing device, a step of producing on the at least one insert at least one texture forming a contrast with respect to a remainder of the molding face.

7. The method according to claim 6, wherein the at least one texture comprises a plurality of elements which protrude and/or are recessed relative to the molding face.

8. The method according to claim 1, further comprising, after the step of extraction from the manufacturing device, a step of cutting in order to finally establish dimensions of the mold element and in order to obtain a molding face formed exclusively by the at least one insert and by the injected aluminum.

9. The method according to claim 1, further comprising, after the step of extraction from the manufacturing device, at least one step of surface treating the molding face of the mold element.

10. The method according to claim 9, further comprising, after the at least one step of surface treating, a step of producing on the at least one insert at least one texture forming a contrast with respect to a remainder of the molding face.

11. The method according to claim 1, wherein a face of the at least one insert arranged against the molding surface of the die is provided with a texture forming a contrast with respect to a remainder of the face.

12. The method according to claim 1, wherein the at least one insert arranged against the molding surface of the die comprises anchoring means which are configured so as to anchor the insert in the injected aluminum.

13. The method according to claim 1, wherein the at least one insert is arranged inside a housing which is recessed from the molding surface of the die.

14. The method according to claim 1, further comprising a step of producing the at least one insert by laser sintering using an additive manufacturing machine, the additive manufacturing machine and the manufacturing device being arranged successively on a same production line.

15. A method of manufacturing a mold for a tire comprising a tread and two side walls, the mold comprising first and second shells for molding the side walls of the tire, and a plurality of sectors distributed in a circumferential direction for molding the tread of the tire, the method comprising the following steps:
- manufacturing at least one mold element using the method according to claim 1; and
- fixing the at least one manufactured mold element on a support block of an associated sector or an associated shell.

* * * * *